United States Patent [19]

Fresnel

[11] Patent Number: 4,660,357
[45] Date of Patent: Apr. 28, 1987

[54] MACHINE FOR PLACING SLEEVE AROUND OBJECTS THAT ARE LAID FLAT

[75] Inventor: Jacques Fresnel, Paris, France

[73] Assignee: Sleever International, Morangis, France

[21] Appl. No.: 815,292

[22] Filed: Dec. 24, 1985

[30] Foreign Application Priority Data

Dec. 28, 1984 [FR] France ................................ 84 19971

[51] Int. Cl.⁴ .............................................. B65B 5/08
[52] U.S. Cl. ....................................... 53/585; 53/290; 53/291; 53/298
[58] Field of Search ................. 53/585, 291, 292, 295, 53/296, 298, 297; 198/408; 156/86

[56] References Cited

U.S. PATENT DOCUMENTS

| | | | |
|---|---|---|---|
| 1,861,567 | 6/1932 | Henry | 53/585 |
| 2,162,472 | 6/1939 | Scharf | 53/585 X |
| 2,654,520 | 10/1953 | Allen | 53/291 X |
| 2,654,520 | 2/1917 | Southcott | 198/408 |
| 2,660,353 | 11/1953 | Gampp | 53/291 X |
| 3,563,377 | 2/1971 | Southcott | 198/408 |
| 3,737,050 | 6/1973 | Leeuwestein | 198/408 X |
| 3,888,067 | 6/1975 | Cross | 53/292 |
| 4,387,553 | 6/1983 | Strub | 53/291 X |

*Primary Examiner*—John Sipos
*Attorney, Agent, or Firm*—Browdy and Neimark

[57] ABSTRACT

The apparatus for placing decorative or protective sleeves of heat-shrinkable plastic over objects which do not easily stand upright. The machine comprises a device to place sleeves vertically over intermediate pins, of suitable diameter, fastened to an endless chain. The pins are brought into horizontal position during the returning of the chain around a wheel inclined at 45°, to circulate in alignment with objects received individually in housings provided on a second endless chain driven at the same linear speed as the first. A cam mechanism is then started to transfer the sleeves of the pins to the objects with which they are aligned.

11 Claims, 4 Drawing Figures

MACHINE FOR PLACING SLEEVE AROUND OBJECTS THAT ARE LAID FLAT

FIELD OF THE INVENTION

The present invention relates generally to apparatus for applying sleeves or sheathings, particularly of heat-shrinkable plastic, around objects, and, more particularly, apparatus designed to apply said sleeves while the objects are held flat in a conveying means.

BACKGROUND OF THE INVENTION

Numerous machines are already known in the art for applying sleeves or sheathings wherein a section of sheathing is placed around an object held in a conveying means with a mandrel, held if necessary in support, for example with rollers made to cause the section of the mandrel to slide toward the object. In particular, it is known that it is imperative that the lower end of the mandrel and the object be in perfect alignment to do this. More specifically, it is necessary that the object be held upright in a stable manner and strictly in a vertical position.

Because of this, there are numerous problems with the present apparatus when it involves placing sleeves on to small-diameter objects, such as lighters, lipsticks, pencils, toothpaste tubes, etc., because of the lack of stability of this type of object, as well as because the upright position of the article on its base is not always completely vertical.

The present invention, therefore, aims to eliminate the inherent drawbacks in sleeve-placing apparatus of the prior art and to propose a sleeve-placing apparatus which is perfectly suited for sheathing of small-diameter objects, or more generally, of any object whose sheathing in vertical position is difficult or impossible to achieve under satisfactory conditions. This sheathing is performed with rates comparable to those obtained with conventional machines.

SUMMARY OF THE INVENTION

For this purpose, the invention relates to an apparatus for placing sleeves or sections of sheathings onto a plurality of objects of elongated shape to be sleeved while laid flat, comprising in combination:

means for placing a plurality of sections of sheathing vertically over a plurality of intermediate pins;

first endless conveying means made to drive the intermediate pins along a predetermined path during which the pins are able to be brought from a vertical position, in which said sections of sheathing are placed into a horizontal position;

second endless conveying means made to drive a plurality of said elongated objects to be sleeved while positioned flat, so that the objects circulate parallel and in strict alignment with the intermediate pins during at least a portion of the predetermined path of these intermediate pins in which they are in horizontal position, and means associated with each intermediate pin, comprising at least a mobile pad able to be applied onto the peripheral surface of the pin, onto which a section of sheathing was previously placed, and able to be driven in an approximately parallel movement to the pin to transfer said section of sheathing of the pin to the object when these pins are in strict alignment.

BRIEF DESCRIPTION OF DRAWINGS

The invention will be better understood after reading the following detailed description, given by way of example and made with reference to the accompanying drawings, in which.

Figure 1:
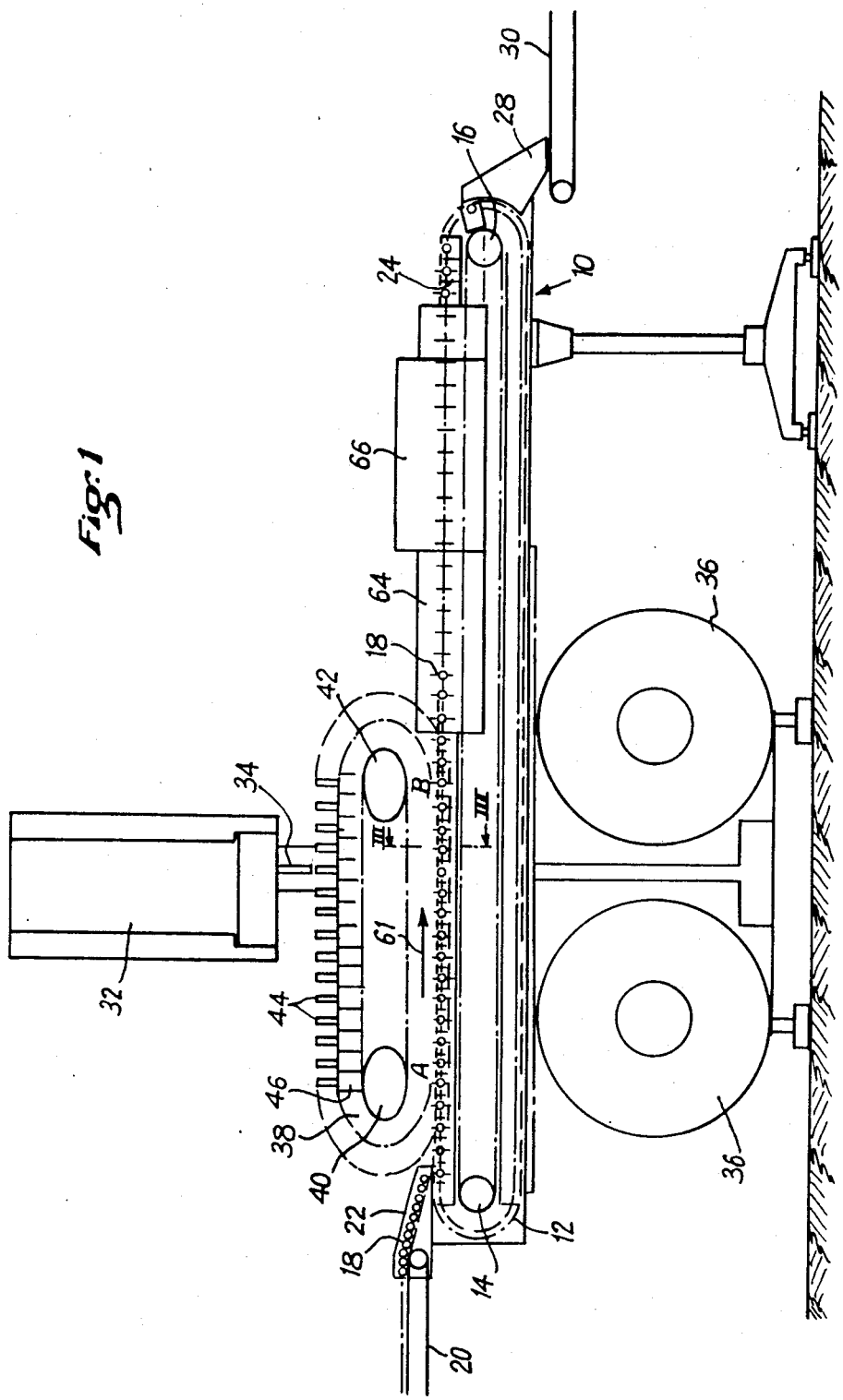
FIG. 1 is a diagrammatic side view of an apparatus for applying sleeves according to this invention.

With reference to the drawings, the apparatus for placing sleeves, according to the preferred embodiment of the inventions, comprises an endless conveying element indicated overall as 10, in the form of an endless chain 12 driven at uniform speed around two transmission gear wheel units 14, 16 by a suitable motor (not shown). Conveyor chain 12 is fed objects 18 intended to be sleeved, with a feed unit comprising feed conveyor 20, such as conveyor belt or the like and a loading chute 22. On the outside of chain 12 are fastened a plurality of cradles 24 which are each made to receive an object to be sleeved. More precisely, each cradle 24 has a housing 26 extending horizontally and crosswise to the direction of movement of the chain, and loading chute 22 is made to deposit an object 18 in each of housings 26 which are successively presented below its output end during the movement of chain 12.

The machine also comprises an evacuation unit comprising an discharge chute 28, which terminates at an evacuation conveyor 30, for example in the form of a conveyor belt or the like.

There is further included, as indicated diagrammatically as 32, a device for placing sleeves or sheathings, for example of the so-called floating mandrel 34 type, i.e. held in support with rollers and on which there can successively be brought to slide sections of sheathings of suitable dimensions obtained from continuous rollers 36 located in the lower region of the machine. In this regard, reference can be made to the French patents published under the numbers 2,490,590 and 2,508,841, which describe such apparatus.

Figure 2:
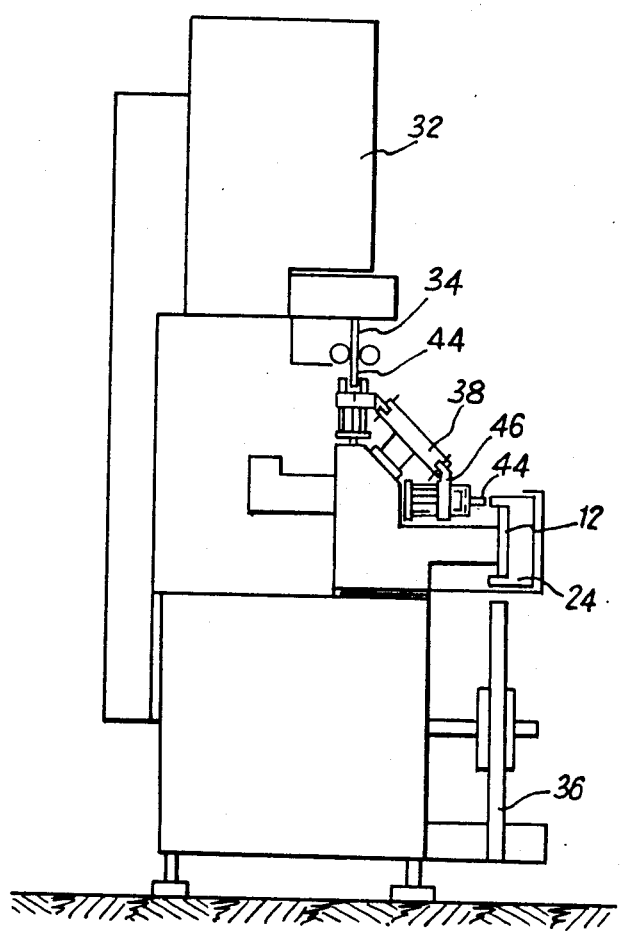
FIG. 2 is a diagrammatic end view of the machine of FIG. 1.

The apparatus of this invention further comprises an endless chain 38 driven continuously around transmission gear wheel units 40, 42 by a suitable motor and in synchrony with chain 12 for conveying the objects. Endless chain 38 supports a plurality of pins 44 by suitable mountings 46. Chain 38 and pins 44 are designed so that, during the returning of the chain downward around gear wheels 40, the pins gradually go from a vertical orientation to a horizontal orientation. In this regard, and as FIG. 2 in particular shows, chain 38 extends in a plane that is inclined approximately at 45° in relation to the vertical, and pins 44 are mounted on the chain so as to be inclined 45° in relation to this circulation plane. The pins are thus brought from a vertical position (upper portion of the path of chain 38), in which they successively come into alignment with mandrel 34 at its lower end, to a horizontal position (lower portion of the path of chain 38), in which they are made to circulate parallel to the circulation path of objects 18 in their respective housings 26. The drive means of the two chains 12 and 38 are further suitably synchronized so that, in at least a portion of their parallel paths, pins 44 and housings 26 are in strict alignment.

Figure 3:
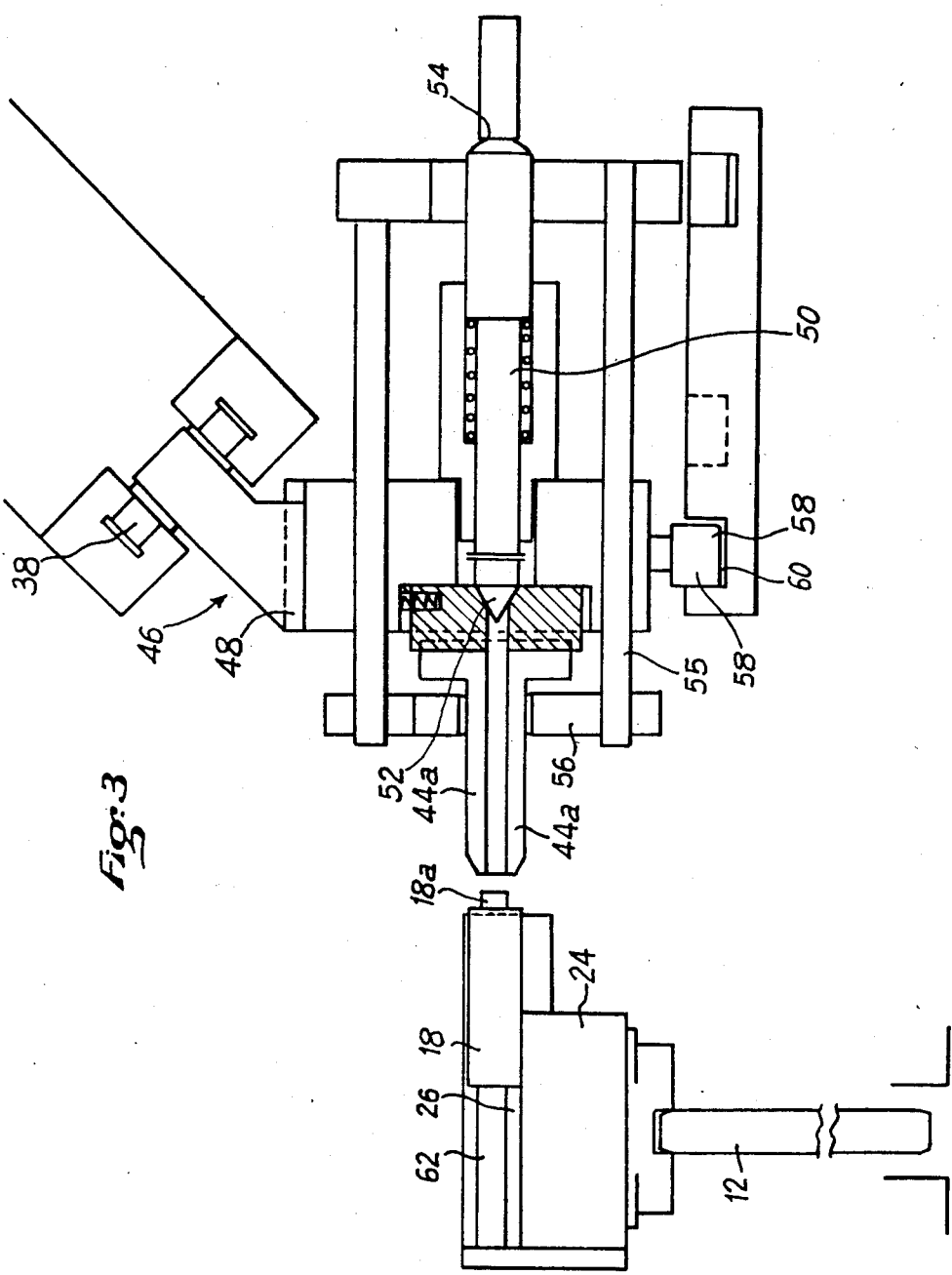
FIG. 3 is a detail view in section along line III—III of FIG. 1.

The structure of pins 44, their mountings 46 and cradles 24 is more in detail in FIG. 3. As this figure shows, each mounting 46 exhibits a 45° bend whose free end is mounted on chain 38. Pin 44 is actually separated into several parts 44a, preferably in the form of sections, which are mounted radially mobile in reinforcement 48 and which are able to be mutually brought together or separated, thus to vary the outside diameter of the pin. In this regard, each reinforcement 48 supports, by sliding, a pusher 50 axially aligned with pin 44 and whose end adjacent to said pin, indicated by 52, is tapered. The other end of pusher 50 is subjected to the action of a cam surface 54 integral with the frame of the machine. Thus, it is understood that by pushing pusher 50 more or less to the left in FIG. 3, the tapered end 52 of said pusher is inserted more or less deeply into the inside space defined by parts 44a that define the pin, and it is thus possible to cause the outside diameter of pin 44 to expand, for reasons explained below.

Reinforcement 48 further supports a sleeve translation mechanism which comprises, in this embodiment, two arms 55 extending approximately parallel to pin 44 and to its coaxial pusher 50, and diametrically opposite in relation to these latter elements; each arm 55, at its left end in FIG. 3, has a pad 56 whose free end carriers a coating with a strong coefficient of friction, such as a polyurethane or a natural rubber, and is able to come selectively in contact with the outside surface of pin 44 as defined by its plurality of elements 44a, and to be put in translation parallel to said pin. In this regard, each arm 55 has its movements controlled by a pin 58 able to be received in a drive cam surface of suitable profile, diagrammatically represented in the form of a groove 60 in FIG. 3, so that it is possible to perform the sequence of movements consisting of: (i) bringing the free ends of pads 56 with the outside surface of pin 44, or more precisely of a section of sheathing received on this pin, as will be seen below; (ii) moving said pads parallel to pin 44, to the left in FIG. 3; (iii) radially separating the free ends of pads 56 from the outside periphery of pin 44; and (iv) bringing the pads back to their starting position, in a movement to the right parallel to pin 44. Drive cam surfaces which are able to impart successively such radial and axial movements to the arms 55 are well known in the art and will not be described or represented here in greater detail.

Figure 4:
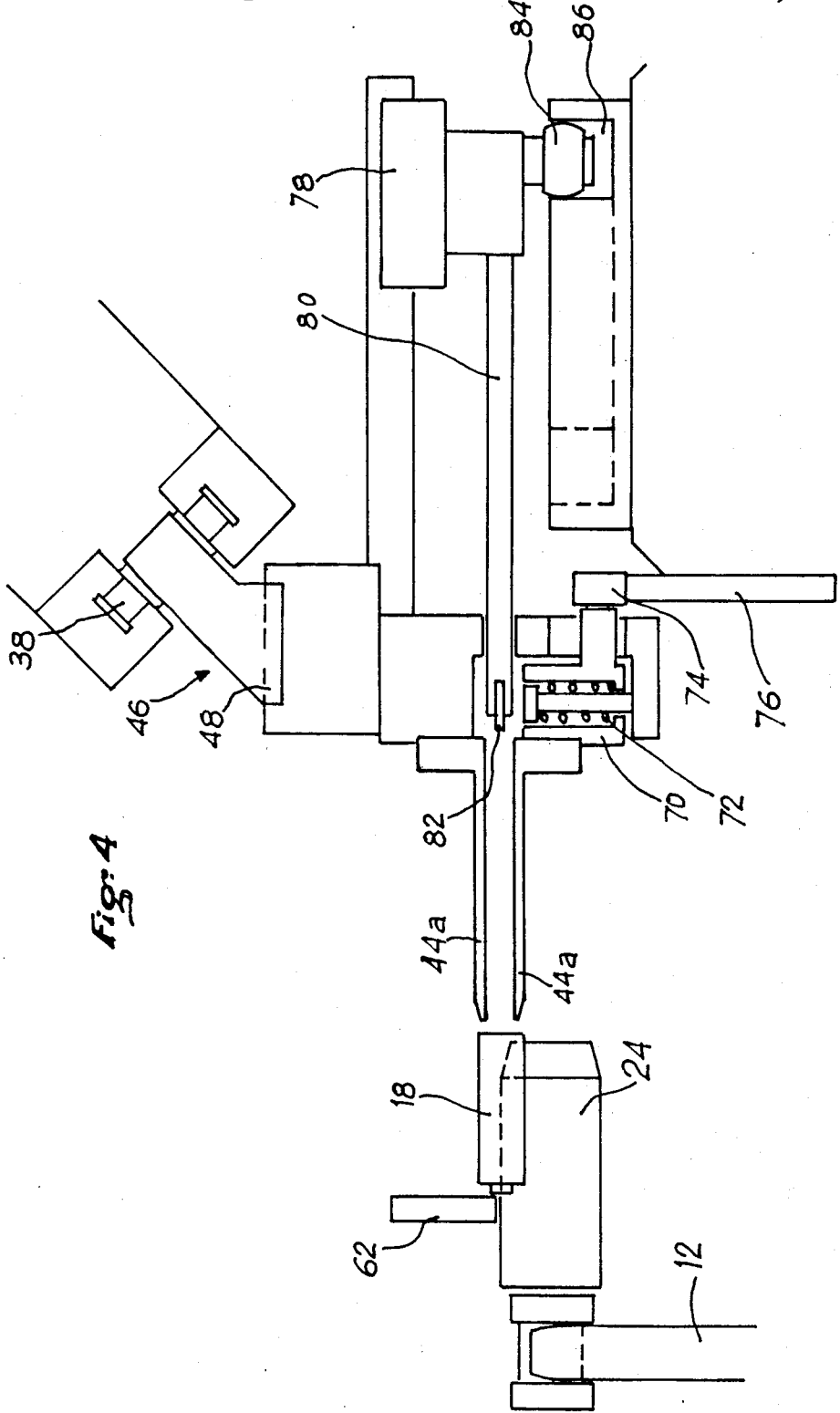
FIG. 4 shows another embodiment of the device of FIG. 3.

FIG. 4 shows other embodiment of pins 44 and their mode of operation. According to this embodiment parts 44a of the pins, in the form of sections, are not both mobile as in the case of FIG. 3. In fact, here one is stationary (upper portion in FIG. 4) and integral with reinforcement 48 while the other (lower portion in the figure) is mobile, solid with a slide 70 returned by a spring 72 which rests on reinforcement 48. Because this spring has a tendency to open the pins (44a at the lower part), a roller 74 has been provided, integral with slide 70 and resting on a cam 76, which more or less closes these pins 44a.

In this embodiment, arms 55 of the device of FIG. 3 are replaced with a carriage 78 which actuates a pusher 80 aligned axially with pin 44 and carrying at its end a blade 82 which, by its movement, inserts itself into the free space created by the opening of the two parts 44a of pin 44. This blade 82 is intended to drive out the plastic sleeve after the separation of pins 44a to transfer it to the object to be sleeved. Carriage 78 is controlled by a roller 84 which is moved in a drive cam, of suitable profile, diagrammatically represented in the form of a groove 86 in this FIG. 4.

The operation of the apparatus for placing sleeves according to this embodiment is as follows:

Objects 18 to be sleeved, such as lighters, lipsticks, pencils, various containers in the shape of tubes, etc., are brought individually flat into housings 26 from feed unit 20, 22, in a predetermined orientation. In this regard, in FIG. 3 an object 18 is represented which exhibits the shape of a cylindrical container provided at one of its ends (in use, its upper end) with a narrower plug, diagrammatically indicated at 18a. Chain 12, which drives cradles 24 having housings 26, is, at this time, driven at a constant speed in the direction of arrow 61. Simultaneously, the device for placing sleeves indicated as 32 is activated, according to a well known process, the placing of sleeves or sections of sheathing (not shown) of heat-shrinkable plastic successively over each of pins 44 which extend vertically from chain 38 and which pass one after the other perpendicular to mandrel 34 of the placing device. To facilitate the descent of the sleeves over pins 44, these pins are put in their contracted state, by pusher 50, when they arrive below said mandrel. Advantageously, this makes placing of the sleeves over the pins possible at very rapid rates. Here again, conveyor chain 38 during this time is driven at a constant linear speed, for example constantly equal to the linear speed of objects 18 conveyed by chain 12. When a pin 44 leaves placing device 32, it is then immediately expanded with its pusher 50, as described above with reference to FIG. 3, until assuming a diameter slightly less than that of the sleeve with which it has been covered. This control of the maximum diameter will be suitably performed by conforming the surface of cam 54, to which pusher 50 is secured, so the pusher performs the necessary and sufficient movement (to the left in FIG. 3) so that this diameter is reached. This expansion of pin 44 advantageously makes it possible to hold the sleeve satisfactorily in place on this pin throughout its travel, until it is placeed as described below on one of objects 18 to be sleeved.

Thus, at the output of transmission gear wheel 40 of chain 38, each of pins 44 circulates in the extension of a housing 26 and consequently of object 18 that it contains, being provided with a sleeve. If, as indicated, the linear speeds of the two chains 12 and 38 are synchronized so as to be strictly equal, this alignment is kept over the entire length of path A-B (FIG. 1).

The placing operation itself takes place at a predetermined position of path A-B. This operation is performed at the moment pins 58 of arms 55 perform the movements imposed by groove 60 and mentioned above in reference to FIG. 3, thus be previously coming to be supported against the sleeve received over the outside surface of pin 44, to cause that of pin 44 to slide toward object 18 to be sleeved. Of course, groove 60 that defines the cam surface will be shaped so that the sleeve is brought into a predetermined longitudinal position on object 13, this latter being immobilized in place during the thrust of the sleeve thanks to a holding rod 62 provided in associated housing 26. It can be noted here that the disengaged opening at the free end of each pin 44, once parts 44a which make it up have been separated by pusher 50 (FIG. 3), will advantageously be able to be used to receive plug 18a of object 18, on the one hand to assure a satisfactory centering of the object at the end of pin 44, and on the other hand to facilitate the transfer of the sleeve from pin 44 to the object, thanks to the reduction of the distance which will then separate these two elements.

In the case of the structural variant illustrated in FIG. 4, the operating principle is the same, the elements having the same functions and giving the same results. However, in this case, the sleeve is transferred not by sliding but by mechanical thrust using blade 82 mounted on pusher 80. A stricter positioning of the sleeve on the object to be covered is thus obtained.

After the placing operation, pins 44, thus free of their sleeve, are sent around wheel 42 toward mandrel device 32 to receive a sleeve again, their cycle described above being repeated.

Once objects 18 are sleeved, they continue their path along chain 12, to go in a conventional way into a first preheating tunnel 64, then in to a shrinking tunnel 66 in which each sleeve is heat-shrunk, for example with jets of air, to enclose its object tightly and thus be attached to it. At the output of tunnel 66, the objects are removed by removal unit 28, 30.

Since all the operations described above are performed continuously, it is possible with this machine to reach extremely high rates of speed which are entirely comparable with those which can be obtained with conventional placing machines in which the objects are held in vertical position throughout their processing.

Of course, the machine as described above will be able to be adapted to various shapes and sizes of objects to be sleeved. In particular, the surfaces of cam 54 and 60, pins 44, arms 55 and their pads 56, mandrel 34 of placing device 32, etc., can be designed to be able to be easily interchanged, or adapted to objects and to sleeves of various dimensions and shapes. In particular, mandrel 34 and objects 44 will be able to have any cross section whatsoever adapted to that of the object to be sleeved.

Finally, the invention is not limited to the specific embodiments described, but includes any other variation or modification that a person skilled in the art will be able to bring to it.

What is claimed is:

1. An apparatus for placing sleeves or sections of sheathings over a plurality of objects of elongated shape to be sleeved comprising:

means for placing a plurality of sections of sheathings vertically over a plurality of vertical intermediate pins;

first endless conveying means made to drive the intermediate pins along a predetermined path and to bring them into strict alignment with said elongated objects, means for moving the pins from their vertical orientation to a horizontal orientation in a portion of said predetermined path;

second endless conveying means made to drive a plurality of said elongated objects to be sleeved in a horizontal orientation, so that the objects circulate parallel and in strict alignment with the intermediate pins during said portion of the predetermined path of these latter transfer means associated with each intermediate pin, on which a section of sheathing was previously placed, for transferring said section of sheathing of the pin onto the object when the objects are in strict alignment with the pin with a movement approximatelly parallel to the pin, and wherein said elongated objects are laid in a horizontal position in said second endless conveying means, and wherein said first endless conveying means are able to bring said intermediate pins from a vertical position, in which said sections of sheathings are placed, into a horizontal position.

2. Apparatus according to claim 1, wherein the means for placing sections of sheathing comprises a placing device having a floating mandrel.

3. Apparatus according to claim 1, wherein the first endless conveying means comprises an endless chain driven around two transmission gear wheels that support a plurality of mountings, a pin and a mobile pad means being mounted on each mounting.

4. Apparatus according to claim 1, wherein the second endless conveying means comprises an endless chain driven in synchrony with the first endless conveying means around two wheels that support a plurality of cradles, an elongated horizontal housing being made in each cradle crosswise in relation to the movements of the chain and able to receive an object to be sleeved.

5. Apparatus according to claim 1 wherein the mobile pad means comprises at least a pad mounted on an arm, a means having a cam surface stationary in relation to the conveying means further being provided to control the movements of the arm and of its pad.

6. Apparatus according to claim 1, including means to cause the diameter of each pin to vary, said means comprising a plurality of parts mounted radially mobile and together defining said pin and a pusher, an approximately tapered end of which is made to be introduced more or less deeply between said parts of the pin to separate the parts of the pin, and thereby vary the outside diameter of the pin.

7. Apparatus according to claim 1, wherein each pin comprises a stationary part and a mobile part for the opening, actuated by a spring system, a pusher moved by a carriage and axially aligned with a pin further being provided to be inserted into the opening of the pin and being provided at its free end with a blade intended to drive the sleeve after the separation of the pins to transfer the sleve to the object to be sleeved.

8. Apparatus according to claim 2, wherein the mobile pad means comprises at least a pad mounted on an arm, a means having a cam surface stationary in relation to the conveying means further being provided to control the movements of the arm and of its pad.

9. Apparatus according to claim 3, wherein the mobile pad means comprises at least a pad mounted on an arm, a means having a cam surface stationary in relation to the conveying means further being provided to control the movements of the arm and of its pad.

10. Apparatus according to claim 4, wherein the mobile pad means comprises at least a pad mounted on an arm, a means having a cam surface stationary in relation to the conveying means further being provided to control the movements of the arm and of its pad.

11. Apparatus according to claim 1, wherein said transfer means include a mobile pad able to be applied with strong friction on the peripheral surface of each of said intermediate pins.

* * * * *